United States Patent [19]

Blum et al.

[11] Patent Number: 5,478,917
[45] Date of Patent: Dec. 26, 1995

[54] SOLUTIONS OF POLYIMIDE-FORMING SUBSTANCES AND THEIR USE AS COATING COMPOSITIONS

[75] Inventors: Rainer Blum, Ludwigshafen; Gerhard Hoffmann, Otterstadt, both of Germany

[73] Assignee: BASF Lacke + Farben Aktiengesellschaft, Muenster, Germany

[21] Appl. No.: 320,396

[22] Filed: Oct. 11, 1994

[30] Foreign Application Priority Data

Oct. 18, 1993 [DE] Germany ............ 43 35 322.3

[51] Int. Cl.[6] ............ C08G 69/26; C08G 73/10
[52] U.S. Cl. ............ 528/353; 528/125; 528/128; 528/170; 528/172; 528/173; 528/176; 528/185; 528/188; 528/220; 528/229; 528/350; 524/379; 524/391; 524/600; 524/606; 524/607; 428/411.1; 428/473.5
[58] Field of Search ............ 528/125, 128, 528/170, 172, 173, 176, 185, 188, 220, 229, 350, 353; 524/600, 606, 607, 379, 391; 428/411.1, 473.5

[56] References Cited

U.S. PATENT DOCUMENTS

| 3,347,808 | 10/1967 | Lavim . | |
|---|---|---|---|
| 3,502,712 | 3/1970 | DeBrunner . | |
| 3,700,649 | 10/1972 | Boram . | |
| 4,874,835 | 10/1989 | Berdahl . | |
| 4,960,824 | 10/1990 | Olson et al. . | |
| 5,264,545 | 11/1993 | Blum et al. | 528/353 |
| 5,332,799 | 7/1994 | Blum et al. | 528/353 |

FOREIGN PATENT DOCUMENTS 271736  1/1991  European Pat. Off. .

Primary Examiner—P. Hampton-Hightower
Attorney, Agent, or Firm—Keil & Weinkauf

[57] ABSTRACT

Solutions of polyimide-forming substances contain
A) aromatic or partly aromatic polyamines and
B) amides or a mixture of esters and amides of tetracarboxylic acids.

Solutions are useful as coating compositions.

3 Claims, No Drawings

SOLUTIONS OF POLYIMIDE-FORMING SUBSTANCES AND THEIR USE AS COATING COMPOSITIONS

BACKGROUND OF THE INVENTION

1. Field of the Invention

The present invention relates to solutions of polyimide-forming substances, containing A) aromatic or partly aromatic polyamines and B) amides or a mixture of esters and amides of aromatic or partly aromatic tetracarboxylic acids.

The present invention furthermore relates to the use of such solutions for the production of coatings and of articles coated with polyimides, and coated articles.

Aromatic polyimides are as a rule insoluble in conventional organic solvents. In general, solutions of the more readily soluble polyamidocarboxylic acids were therefore used as polyimide-forming intermediates for polyimide-forming coatings. The polyimides then form from these intermediates on drying, for which temperatures of up to 400° C. are used.

Disadvantages of the polyimide-forming polyamidocarboxylic acid coatings are their very high viscosities in relation to the solids content. This makes them more difficult to process and requires high dilutions.

Considerable disadvantages arise in applications in microelectronics where polyamidocarboxylic acid coatings are used as planarizing layers in the microelectronic structures, high concentrations in conjunction with low viscosities being required for good planarizing.

Furthermore, polyamidocarboxylic acids have a short shelf life since they tend to undergo self-hydrolysis and premature imide formation. Most polyamidocarboxylic acid coating materials therefore have to be stored in a freezer.

OBJECT OF THE INVENTION

In order to remedy these disadvantages, attempts have already been made to use solutions of monomeric starting materials for direct polyimide formation.

U.S. Pat. No. 3,502,712 describes solutions of special tetracarboxylic acid derivatives which are obtained from benzophenonetetracarboxylic acid and saturated amino alkanols.

U.S. Pat. No. 3,700,649 discloses polyimides which are obtained from aromatic diamines and symmetric diesters of benzophenonetetracarboxylic acid.

Furthermore, U.S. Pat. No. 3,347,808 discloses solutions of polyamines and alkyl esters of tetracarboxylic acids.

U.S. Pat. No. 4,874,835 relates to mixtures of special diamines with oxydiphthalates.

U.S. Pat. No. 4,960,824 states that the preparation of polyimides via diester intermediates is problematic in that the shelf life of the solutions is poor, as in the case of many combinations of diesters and diamines. According to this publication, only very specific combinations of special diamines and partly aliphatic tetracarboxylic acids are suitable.

SUMMARY OF THE INVENTION

It is an object of the present invention to provide improved solutions of polyimide-forming substances.

We have found that improved solutions of polyimide-forming substances are provided which contain A) aromatic or partly aromatic polyamines and B) amides or a mixture of esters and amides of aromatic or partly aromatic tetracarboxylic acids.

DESCRIPTION OF THE PREFERRED EMBODIMENTS

The industrially most important polyheterocycles for the purposes of the present invention are polyimides, but polyheterocycles such as polyisoindoloquinazolinediones or polyarylenebenzimidazoles are also included. The term polyimide is used below as a synonym for all polyheterocycles.

The individual components of the solutions are described below.

Preferred polyamine components A) are aromatic and/or partly aromatic polyamines, diamines being preferred.

Examples of suitable diamines are:
p-phenylenediamine,
m-phenylenediamine,
(4,4'-diaminodiphenyl) oxide,
(3,3'-diaminodiphenyl) oxide,
(3,4'-diaminodiphenyl) oxide,
(4,4'-diaminodiphenyl) sulfide,
(3,3'-diaminodiphenyl) sulfide,
(3,4'-diaminodiphenyl) sulfide,
(4,4'-diaminodiphenyl) sulfone,
(3,3'-diaminodiphenyl) sulfone,
(3,4'-diaminodiphenyl) sulfone,
(4,4'-diaminodiphenyl)-methane,
(3,3'-diaminodiphenyl)-methane,
(3,4'-diaminodiphenyl)-methane,
(4,4'-diaminodiphenyl)-propane,
(3,3'-diaminodiphenyl)-propane,
(3,4'-diaminodiphenyl)-propane,
(4,4'-diaminodiphenyl)-ethane,
(3,3'-diaminodiphenyl)-ethane,
(3,4'-diaminodiphenyl)-ethane,
4,4'-bis-(4,4'-aminophenoxy)-biphenyl,
4,4'-bis-(4,3'-aminophenoxy)-biphenyl,
2,2-bis[4-(4,4-aminophenoxy)phenyl]-propane,
2,2-bis[4-(4,4-aminophenoxy)phenyl]-perfluoropropane,
2,2-bis[4-(3,4-aminophenoxy)phenyl]-propane,
2,2-bis[4-(3,3-aminophenoxy)phenyl]-propane,
2,2-bis[4-(4,4'-aminophenoxy)phenyl] sulfone,
2,2-bis[4-(3,4-aminophenoxy)phenyl] sulfone,
2,2-bis[4-(3,3'-aminophenoxy)phenyl] sulfone,
4,4'-dimethyl-3,3'-diaminodiphenyl sulfone,
2,2-bis[4-(4,4'-aminophenoxy)phenyl] sulfide,
2,2-bis[4-(3,3'-aminophenoxy)phenyl] sulfide,
2,2-bis[4-(3,3'-aminophenoxy)phenyl] sulfide,
2,2-bis[4-(4,4'-aminophenoxy)phenyl]-methane,
2,2-bis[4-(3,4-aminophenoxy)phenyl]-methane,
2,2-bis[4-(3,3'-aminophenoxy)phenyl]-methane,
1,4-bis-(4,4'-aminophenoxy)-phenylene,
1,4-bis-(3,4'-aminophenoxy)-phenylene,
1,4-bis-(3,3'-aminophenoxy)-phenylene,
4,4'-diaminodiphenyl (benzidine),
3,4'-diaminodiphenyl, 3,3'-diaminodiphenyl,
3,3'-dimethoxy-4,4'-diaminodiphenyl,
3,3'-dimethoxy-3,4'-diaminodiphenyl,
3,3'-dimethyl-4,4'-diaminodiphenyl,
3,3'-dimethyl-3,4'-diaminodiphenyl,
1,8-diaminonaphthalene,
1,5-diaminonaphthalene,
p-terphenyl-4,4"-diamine, p-terphenyl-3,3"-diamine,
5-tert-butyl-2,4-toluylenediamine, 3-tert-butyl-2,6-toluylenediamine,
3,5-diethyl-2,4-toluylenediamine,
3,5-diethyl-2,6-toluylenediamine,
alkylisopropyltoluylenediamines, such as diisopropyltoluylenediamine,
α,ω-diamino-(polyphenylene sulfides),
m-xylylenediamine,
p-xylylenediamine,
bis-4,4'-[(2,6-diisopropyl)aminophenyl]methane,
bis-4,4'-[(2-methyl-6-isopropyl)aminophenyl]methane,
bis-4,4'-[(2,6-dimethyl)aminophenyl]methane,
bis-4,4'-[(2,6-diisopropyl)aminophenyl] ether,
bis-4,4'-[(2-methyl-6-isopropyl)aminophenyl] ether or
bis-4,4'-[(2,6-dimethyl)aminophenyl] ether.

Further polyamines are tetraamines, such as 3,3',4,4'-tetraaminobiphenyl, 3,3',4,4'-tetraaminodiphenylmethane, 3,3',4,4'-tetraaminodiphenyl ether, 3,3',4,4'-tetraaminodiphenyl sulfone or 3,3',4,4'-tetraaminodiphenyl sulfide. Such tetraamines give polyarylenebenzindazoles as the final structure.

A further important group of diamines comprises aromatic polynuclear compounds which are bonded via benzanilide groups, eg. 3,3'-diaminobenzanilide, 3,4'-diaminobenzanilide, 4,3'-diaminobenzanilide, 4,4'-diaminobenzanilide or 4,3'-diaminobenzanilide, and the N-alkyl substitution products of these anilides, as well as the α,ω-diaminopolyanilides according to EP-A 271736.

The object is to obtain polyimides having the best possible combinations of properties. These are obtained by means of a wholly aromatic structure. The novel polyimides are therefore preferably prepared using purely aromatic diamines.

Although dimmines which are not purely aromatic generally have an adverse effect on the heat stability of the end products, cycloaliphatic, heterocyclic and aliphatic amine compounds having an amine functionality greater than 1, preferably 2 or higher, may however be used or be present for obtaining specific properties, such as surface smoothness, flexibility, etc.

These are, for example, diamino(dimethyl)dicyclohexylmethane, diamino(dimethyldiisopropyl)dicyclohexylmethane, diamino(tetraisopropyl)dicyclohexylmethane, diamino(diisopropyl)dicyclohexylmethane, diaminoalkylenes or diaminopolyoxyalkylenes.

The term dimmines is intended to include compounds which contain the structural element N—N, ie. derivatives of hydrazine.

Aromatic dimmines which are further substituted by reactive groups in the nucleus are also important. Such reactive substituents are, for example, carboxyl, hydroxyl, amine and amide groups. Using such substituted amines, polyheterocycles having a nonimide structure are then also formed. In the case of the o-aminocarboxamides, such as that of anthranilamide, polyisoindoloquinazolinediones are obtained as the final structure. Polybenzoxazoles are obtained using dihydroxydiamines, and polyarylenebenzimidazoles using tetraamines. The present invention also relates to such polymers.

According to the invention, salts and partial salts of the amines may also be used or may be present, for example the carbonates, acetates, trifluoroacetates, trichloroacetates, formates, oxalates, maleates, methanesulfonates, benzenesulfonates, chlorides, etc. It has been found that the use of such salts suppresses the strong discoloration, particularly of the aromatic diamines, and gives smoother films in the case of some combinations.

The starting materials stated are known or can be prepared by processes known per se. The list of starting materials is given only by way of example, and the invention is not restricted to the use of these substances.

Suitable components B) are amides or mixtures of esters and amides of tetracarboxylic acids.

The tetracarboxylic acid derivatives may be described by the general formula I:

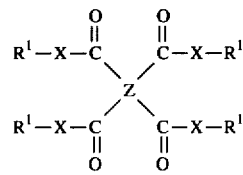

In this formula, X may be —O—, —NH— or —NR$^1$—.

Z is a tetravalent, aromatic or partly aromatic radical which may furthermore be modified by a heterocyclic structure, or may furthermore be an aliphatic or cycloaliphatic radical which may also comprise partially or completely halogenated structural elements.

R$^1$ is alkyl having 1 to 20 carbon atoms, such as methyl, ethyl, propyl, isopropyl, n-butyl, isobutyl, pentyl, hexyl or heptyl or an isomer thereof, octyl, 2-ethylhexyl or another higher homolog, or cycloalkyl, preferably cyclohexyl or methylcyclohexyl, alkoxyphenyl, preferably phenoxybutyl, phenoxypropyl or phenoxyethyl, aryl such as phenyl, benzyl, cumyl or cresyl, or hydrogen. R$^1$ is particularly preferably ethyl, propyl, isopropyl, n-butyl or one of the stated alkoxyphenyl radicals.

Diamides or diesters are preferred, ie. R$^1$ may simultaneously be hydrogen and the other stated radicals. The diamides or diesters may be symmetric or asymmetric.

Compounds of the general formula II may also be used as tetracarboxylic acid derivatives B):

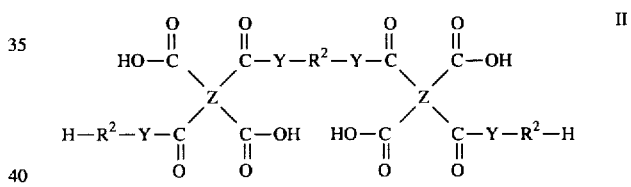

In this formula, Y is —O—, —NH— or —NR—, where —R— has the same meanings as R$^2$.

R$^2$ is a divalent alkyl or alkoxyalkyl radical of 2 to 6 carbon atoms.

Any mixtures of compounds of the formulae I and II may also be used.

The tetracarboxylic acids stated below are suitable parent tetracarboxylic acids from which the radical Z is derived.

Aromatic or partly aromatic tetracarboxylic acids, such as pyromellitic acid,
benzene-1,2,3,4-tetracarboxylic acid,
3,3',4,4'-biphenyltetracarboxylic acid,
2,2',4,4'-biphenyltetracarboxylic acid,
2,3,3',4'-biphenyltetracarboxylic acid,
2,2',3,3'-benzophenonetetracarboxylic acid,
2,3,3',4'-benzophenonetetracarboxylic acid,
2,3,6,7-naphthalenetetracarboxylic acid,
1,2,5,6-naphthalenetetracarboxylic acid,
1,2,4,5-naphthalenetetracarboxylic acid,
1,4,5,8-naphthalenetetracarboxylic acid,
1,2,6,7-naphthalenetetracarboxylic acid,
2,6-dichloronaphthalene-1,4,5,8-tetracarboxylic acid,
2,7-dichloronaphthalene-1,4,5,8-tetracarboxylic acid,
2,3,6,7-tetrachloronaphthalene-1,4,5,8-tetracarboxylic acid,
1,4,5,8-tetrachloronaphthalene-2,3,6,7-tetracarboxylic acid,
4,8-dimethyl-1,2,3,5,6,7-hexahydronaphthalene-1,2,5,6-tetracarboxylic acid, 4,8-dimethyl-1,2,3,5,6,7-hexahydronaphthalene-2,3,6,7-tetracarboxylic acid,
4,4'-oxydiphthalic acid,
3,3'-oxydiphthalic acid,
4,4'-sulfonyldiphthalic acid,
4,4'-thiodiphthalic acid,
3,3'-thiodiphthalic acid,
4,4'-acetylidenediphthalic acid,
bis(2,3-dicarboxyphenyl)methane,
bis(3,4-dicarboxyphenyl)methane,
1,1-bis(2,3-dicarboxyphenyl)ethane,
1,1-bis(3,4-dicarboxyphenyl)ethane,
2,2-bis(2,3-dicarboxyphenyl)propane,
2,2-bis(3,4-dicarboxyphenyl)propane,
phenanthrene-1,2,7,8-tetracarboxylic acid,
phenanthrene-1,2,6,7-tetracarboxylic acid,
phenanthrene-1,2,9,10-tetracarboxylic acid,
2,3,9,10-perylenetetracarboxylic acid,
3,4,9,10-perylenetetracarboxylic acid,
2,3,8,9-perylenetetracarboxylic acid,
4,5,10,11-perylenetetracarboxylic acid,
3,3",4,4"-p-terphenyltetracarboxylic acid,
2,2",3,3"-p-terphenyltetracarboxylic acid or
2,3,3",4"-p-terphenyltetracarboxylic acid,
are preferred.

Butane-1,2,3,4-tetracarboxylic acid, cyclobutanetetracarboxylic acid, cyclopentane-1,2,3,4-tetracarboxylic acid, pyrrolidine-2,3,4,5-tetracarboxylic acid, thiophene-2,3,4,5-tetracarboxylic acid, pyrazine-2,3,5,6-tetracarboxylic acid, tetrahydrofurantetracarboxylic acid, 9-bromo-10-mercaptoanthracenetetracarboxylic acid, 9,10-dimercaptoanthracenedicarboxylic acid, 2,6-endovinylenecyclohexane-1, 2,4,5-tetracarboxylic acid and hexafluoroisopropylidene-2, 2-bis(phthalic anhydride) are also suitable.

Other suitable isomers and substitution products of the stated polycarboxylic acids are halogen-substituted products, in particular fluorine-substituted or perfluoro products and/or alkyl-substituted products and polycarboxylic acids containing silicon.

The dimerization and oligomerization products of trimellitic anhydride with alcohols, amines and isocyanates having a functionality of >2 and especially the 4,4-esterification, 4,4-etherification and 4,4-amidation dimers of trimellitic acid are also suitable. According to the invention, the salts or partial salts of tetracarboxylic acid compounds may also be used or may be present, provided that they still have free carboxyl groups, for example ammonium salts and salts with readily volatile amines, such as mono-, di- and trimethylamine, mono-, di- and triethylamine and other amines. The phosphonium and sulfonium salts of acidic tetracarboxylic acid compounds may also be used or may be present. The use of such salts generally leads to desired, lower viscosities in conjunction with a higher solids content.

The tetracarboxylic acids stated are known or can be prepared by known processes.

The list of starting materials is given only by way of example, and the invention is not restricted to the use of these substances.

The tetracarboxamides and tetracarboxylic esters can be prepared in a known manner by reacting the corresponding tetracarboxylic dianhydrides with primary and/or secondary monoamines and monoalcohols (compounds I) or with primary and/or secondary diamines or diols (compounds of the formula II). Diamides and diesters are preferably prepared by using corresponding molar amounts of amine/alcohol. However, the mono, tri or tetra derivatives or mixtures thereof with the diamides or diesters can also be prepared by using correspondingly larger or smaller amounts of amine/alcohol, and can be used. The manner in which the reaction can be appropriately controlled is known to a person skilled in the art.

The amides or esters can be prepared separately or alongside one another. It is also possible concomitantly to use relatively small amounts of water or not to remove all the resulting water of reaction, so that free tetracarboxylic acids can be obtained, also in proportions.

According to the invention, amides or ester/amide mixtures are used as components B). When ester/amide mixtures are used, the amount of amide may be from 20 to 80, preferably from 40 to 60, mol %.

The novel intermediates are as a rule synthesized in suitable organic solvents; preferred substances are polar substances, such as:
formamide,
acetamide,
N-methylformamide,
N,N-dimethylformamide,
N,N-diethylformamide,
N-methylpyrrolidone,
dialkylacetamides, such as
N,N-dimethylacetamide or
N,N-diethylacetamide,
alkylalkylenediureas, such as
dimethylethylenediurea or
dimethylpropylenediurea,
alkyleneureas, such as
ethylenediurea or
propylenediurea,
butyrolactone,
caprolactam
pyrrolidone,
N-alkylpyrrolidones, such as
N-methylpyrrolidone (NMP),
N-ethylpyrrolidone,
N-cyclohexylpyrrolidone or
N-acetylpyrrolidone, as well as
dimethyl sulfoxide,
dimethyl sulfone, or
hexamethylenephosphorotriamide.

These polar substances may be partially or completely replaced by further solvents, such as alcohols, esters, ketones, ethers and cycloaliphatic ketones, alcohols, esters, amines, especially tertiary amines, such as triethylamine, water, glycols, glycol esters, glycol ethers and hydrocarbons. The choice of solvent depends on the solubility of the other substances and on the desired concentration and viscosity and has to be optimized in specific cases. In some cases, the tetracarboxylic acid compounds, too, are relatively low-viscosity liquids so that it is possible to work without a solvent or with only very little additional solvent and thus to produce polyimide coating materials having an extremely high solids content.

The novel solutions contain the polyamine A) and the tetracarboxylic acid derivatives B) preferably in a molar ratio of from 1.5:1 to 1:1.5, particularly preferably 1:1.

The solids content of the solutions is preferably from 35 to 60% by weight. The viscosity is preferably from 500 to 10,000 mPa.s. For specific applications, however, the desired parameters may be adjusted as required by corresponding dilution.

For the preparation of the solutions, tetracarboxylic acid derivatives, polyamine and solvent may be combined in any order. For example, it is possible first to prepare the tetracarboxylic acid derivatives and to add the diamine and, if required, further solvent to the mixture obtained. In order to dissolve all components, stirring is carried out, if required, at room temperature or at elevated temperatures, for example from 30° to 120° C., in particular 40°–80° C.

The novel solutions may contain conventional additives, such as catalysts for imide formation, dyes, pigments, fillers, leveling agents and viscosity regulators.

They are suitable as coating materials for the production of coatings on a very wide range of substrates, for example metal, glass or silicon. The coating is preferably cured at final temperatures of from 150° to 450° C., particularly preferably from 300° to 400° C. It has proven particularly advantageous to carry out the curing process in a plurality of stages by gradually increasing the temperature to the final temperature.

The novel solutions are used in the coating of silicon wafers for producing electronic circuits, ceramic and metal for producing composite circuits, in particular for the production of multi-chip modules, for coating wire, for coating optical waveguides of glass or quartz, for coating metal films for the production of flexible printed circuit boards, for coating, impregnating and adhesively bonding ordered and random, sheet-like and formed fiber materials, for encapsulating electronic and electric circuits and windings and for the production of powders, fibers, free films or moldings.

EXAMPLES

The examples which follow illustrate the invention without restricting it to the examples given.
General method:

The tetracarboxylic acid component was first reacted with the amine component and, if required, the alcohol component, after which the diamine component A) was added.

| | |
|---|---|
| BTDA | Benzophenonetetracarboxylic acid dianhydride |
| BTA-DE | Diethyl benzophenonetetracarboxylate |
| BTA-TM | Tetramethyl benzophenonetetracarboxylate |
| BAPP | 2,2-Bis[4-aminophenoxy)phenyl]propane |
| PPDA | p-Phenylenediamine |
| MPG | Ethyleneglycol monophenyl ether |
| NMP | N-Methylpyrrolidone |
| DMAP | Dimethylaminopyridine |
| DIPA | Dipropylamine |
| DADO | 4,4'-Diaminodiphenyl ether |
| BPDA | Diphenyltetracarboxylicacid dianhydride |

All starting materials were taken from freshly opened original bottles from commercial suppliers of chemicals. The highest purity level (electronic grade, pro analysis, etc.) was always used. Liquid starting materials were predried over a molecular sieve.

The experiments were carried out under very pure nitrogen in stirred glass flasks with an attached reflux condenser.

Comparative Example 1 (VG1) corresponds to Example 1 of U.S. Pat. No. 3,347,808

23.30 g of DADO 0.117 mol (48% excess)

36.00 g of dioxane 18.00 g of NMP, dissolve, add a solution of 32.50 g of BTA-DE (0.079 mol) in 50.66 g of dioxane 25.33 g of NMP Comparative Example 2 (VG2) corresponds to U.S. Pat. No. 3,347,808

15.00 g of DADO 0.079 mol 23.17 g of dioxane 11.58 g of NMP, dissolve, add a solution of 32.50 g of BTA-DE 0.083 mol (5% excess) in 53.19 g of dioxane 26.59 g of NMP Example 1 (B1) according to the invention Stir 25.46 g of BTDA (0.079 mol)

94.83 g of dioxane 47.41 g of NMP under nitrogen, add 13.80 g of MPG (0.100 mol) and 5.90 g of DIPA (0.058 mol), stir for one hour at 90° C., cool to 60° C. and stir in 15.80 g of DADO and allow to cool while stirring.

| Comparison of | VB1 | VB2 | B1 |
|---|---|---|---|
| Appearance | clear | clear | clear |
| Color | brown | brown | brown |
| Shelf life (1) | precipitate | o.k. | o.k. |
| Calculated solids content | 30% | 30% | 30% |
| Imide residue (2) | 21.3% | 24.2% | 25.4% |
| Max. film thickness (3) | 8 µM | 2 µm | 110 µM |
| Mandrel bending test (4) | torn | crumbled | passed |

The comparison shows that thin cohesive films can be produced according to U.S. Pat. No. 3,347,808 only with a considerable excess of diamine, but that said films have only poor mechanical properties (VB1) and these solutions furthermore have a short shelf life. If, also according to this publication, a slight excess of tetracarboxylic diester is used (VB2), only extremely thin films having very poor mechanical properties are obtained. Furthermore the different imide residues in the case of VB1 and VB2 show that the excess of, respectively, diamine and diethyl benzophenonetetracarboxylate, which are useful starting materials, is lost during curing. In contrast, in novel procedure (B1) it is possible to produce very thick, smooth films having excellent flexibility. The imide residue corresponds to the calculated value, ie. complete conversion to polyimide is achieved.

In the experiments which lead to the present invention, it was found that certain polyimides could not be obtained according to the prior art from solutions of monomeric building blocks. These were in particular the polyimides which have the combination of properties which is particularly desirable in microelectronics and comprises low thermal expansion, very good electrical insulating properties and very high heat stability. However, it is very desirable in microelectronics to produce just such polyimides from highly concentrated solutions having a long shelf life, in order to achieve improved planarizing in the production of microelectronic circuits. A particularly advantageous combination of desirable properties is achieved, for example, with polyimides based on benzophenonetetracarboxylic acid, biphenyltetracarboxylic acid and p-phenylenediamine. Coating materials from which these polyimides can be obtained are therefore offered by most polyimide producers. They are all relatively dilute solutions of polyamidocarboxylic acids. The examples which follow show that it is possible according to the present invention, by using (partial) esters and (partial) amides, also to prepare such polyimides from highly concentrated solutions having a long shelf life.

Comparative Example 3 (VB3) Polyamidocarboxylic acid

Initially take

| | |
|---|---|
| 1026 g of NMP, | dissolve |
| 32.44 g of PPDA | (0.30 mol) therein while stirring, add a mixture of |
| 44.13 g of BPDA | (0.15 mol) and |
| 48.33 g of BTDA | (0.15 mol) in five equal portions while cooling and stirring vigorously at from 5 to 10° C., and continue stirring without cooling until room temperature is reached. A highly viscous solution having a theoretical solids content of 10% is formed. In the experiment to prepare a 15% strength solution, such a high viscosity was obtained (26200 mPa.s at 25° C.) that the solution was no longer processable for electronic applications. |

Comparative Example 4 (VB4) according to the prior art, eg. U.S. Pat. No. 3,347,808

Stir

| | |
|---|---|
| 114.10 g of NMP | |
| 44.13 g of BPDA | (0.15 mol) |
| 0.50 g of DMAP | |
| 69.10 g of MPG | (0.50 mol) for 30 minutes at 120° C., cool to 60° C., add |
| 57.94 g of BTA-TM | 0.15 mol), add |
| 32.44 g of PPDA | (0.30 mol) while stirring vigorously, continue stirring for 60 minutes at 60° C. and cool. |

Example 2 (B2)

Initially take

| | |
|---|---|
| 93.40 g of NMP, | suspend |
| 44.13 g of BPDA | (0.15 mol) |
| 48.33 g of BTDA | (0.15 mol) |
| 69.10 g of MPG | (0.50 mol) |
| 30.30 g of DIPA | (0.30 mol) |
| 0.50 g of DMAP | therein while stirring, stir for 30 minutes at 120° C., cool to 60° C., add |
| 32.44 g of PPDA | (0.30 mol) while stirring vigorously, continue stirring for 60 minutes at 60° C. and cool. |

Example 3 (B3)

Initially take

| | |
|---|---|
| 125.29 g of NMP, | dissolve |
| 29.42 g of BPDA | (0.10 mol) |
| 41.40 g of MPG | (0.30 mol) |
| 10.10 g of DIPA | (0.10 mol) |
| 0.50 g of DMAP | therein while stirring, stir for 30 minutes at 120° C., cool to 60° C., add |
| 41.43 g of BTA-DE | (0.10 mol) |
| 38.63 g of BTA-TM | (0.10 mol), add |
| 32.44 g of PPDA | (0.30 mol) while stirring vigorously, continue stirring for 60 minutes at 60° C. and cool. |

| Comparison of | VB3 | VB | B2 | B3 |
|---|---|---|---|---|
| Appearance | clear | clear | clear | clear |
| Color | brown | brown | brown | brown |
| Shelf life (1) | o.k. | o.k. | o.k. | o.k. |
| Calculated solids content | 10.80% | 55% | 61% | 57% |
| Imide residue (2) | 9.81% | 35.22% | 35.80% | 35.40% |
| Viscosity [mPas/25° C.] | 12000 | 2600 | 1980 | 2100 |
| Max. film thickness (3) | 30 μm | 8 μm | 60 μm | 65 μm |
| Mandrel bending test (4) | passed | crumbled | passed | passed |

(1) After 50 days at room temperature, o.k. means unchanged in appearance, viscosity and film formation.
(2) Sample weight 2 g on a sheet metal cover of 120 mm diameter, residue after 2 hours at 300° C. under air.
(3) The solutions are applied to metal sheets with a knife coater having a wedge-shaped gap and the temperature is increased at a rate of 10° C./minute to 300° C. and then maintained for one hour. After cooling, the maximum coat thickness up to which smooth, blister-free films are obtained is measured.
(4) The metal sheets from (3) coated with the knife coater having a wedge-shaped gap are bent over a test mandrel of 1 mm diameter in a mandrel bending tester.

Examples VB3, VB4, B2 and B3 show the considerable advance of the novel starting materials with regard to the ratio of viscosity to solids content, the film formation capacity also being excellent.

In the reaction of the anhydrides with hydroxy compounds and amines, mono, tri and tetra compounds may also be formed; this depends on the reactivity of the anhydrides and of the hydroxy compounds and amines and statistical parameters of the total batch and is not critical for carrying out the invention. This is also true of the question of the isomerism of the resulting tetracarboxylic acid compounds, which depends on the reactivity of the individual substances, their ratio in the mixture and the selected reaction conditions. In Examples B2 and B3, a slight excess of MPG is present and is intended to ensure that substantially all anhydride groups are converted, in order to avoid undesirable polyamidocarboxylic acid formation on addition of the diamine, which would cause an undesirable increase in viscosity.

We claim:

1. A solution of a polyimide-forming substance, containing

A) aromatic or partly aromatic polyamines and

B) amides or a mixture of esters and amides of tetracarboxylic acids.

2. A solution as defined in claim 1, containing, as components B), diesters and diamides of aromatic or partly aromatic tetracarboxylic acids.

3. An article coated with a polyimide and obtained using a solution as defined in claim 1.

* * * * *